UNITED STATES PATENT OFFICE 2,405,969

PROCESS FOR THE PURIFICATION OF EPSILON-CAPROLACTAM

Elmore L. Martin, Wilmington, Del., assignor to E. I. du Pont de Nemours & Company, Wilmington, Del., a corporation of Delaware No Drawing. Application September 15, 1942, Serial No. 458,455

7 Claims. (Cl. 260—239)

This invention relates in general to the purification of lactams, and particularly to the purification of lactams containing amino-compounds as impurities. Still more particularly, this invention relates to the purification of epsilon-caprolactam containing as an impurity, epsilon-aminocapronitrile.

In the preparation of lactams, the crude product very often contains amino-compounds as impurities. In the specific case of epsilon-caprolactam, the usual impurity to be found is epsilon-aminocapronitrile. It is very desirable to remove the last traces of amino-compound impurities from epsilon-caprolactam, because slight amounts of impurities interfere with the utilization of epsilon-caprolactam for making polyamides. The polymeric products prepared from epsilon-caprolactam containing small amounts of epsilon-aminocapronitrile are greatly inferior to those prepared from the pure lactam and moreover, the results obtained are not uniform. The separation of the last traces of epsilon-aminocapronitrile from epsilon-caprolactam by fractional distillation or by crystallization is laborious and inefficient. It is apparent then that a simple and efficient process for freeing lactams from amino-compounds is required by the art.

The graphic formula for epsilon-caprolactam is as follows:

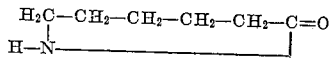

It is an object of this invention to provide a simple and practical method for preparing pure lactams. Another object is to provide a method for separating lactams from mixtures thereof with amino-compounds containing amino-hydrogen atoms. A still further object is to provide a method for separating epsilon-aminocapronitrile from epsilon-caprolactam.

The above and other objects are accomplished according to the present invention wherein a lactam containing an amino-compound impurity is treated with an organic ester and thereafter the lactam is separated from the mixture by distillation.

In one specific embodiment the crude lactam is treated with an amount of a carboxylic acid ester which is at least chemically equivalent to the epsilon-aminocapronitrile content of the crude lactam, the mixture is heated with agitation to a temperature between 50° and 350° C., and therefater vacuum distilled to separate the epsilon-caprolactam.

The following examples illustrate the practice of the invention, without however limiting it thereto. Parts are by weight unless otherwise designated.

*Example 1.*—To 500 parts of molten epsilon-caprolactam containing less than 2.5 parts of epsilon-aminocapronitrile is added 5 parts of diethyl oxalate. The reactants are mixed thoroughly and the mixture is heated at 170° C. at atmospheric pressure for 10 minutes. The pressure is reduced gradually and a foreshot (15 parts) of essentially pure epsilon-caprolactam boiling at 133° to 134° C. at 9 mm. is obtained. The main portion (470 parts) of pure lactam boils at 134° to 135° C. at 9 mm. The residue amounts to 15 parts. The epsilon-caprolactam obtained in accordance with the above procedure is free of epsilon-aminocapronitrile and the pH of a 2 percent aqueous solution at 20° C. is 5.58. The pH of a 2 per cent aqueous solution of the epsilon-caprolactam before purification is 9.78.

*Example 2.*—A mixture of 500 parts of epsilon-caprolactam containing less than 2.5 parts of epsilon-aminocapronitrile and 3 parts of diphenyl carbonate is heated in a glass reaction vessel at 150° C. for 20 minutes. In order to secure thorough mixing, the mixture is stirred mechanically during the heat-treatment. The pressure is reduced gradually and a foreshot (5 parts) of phenol and epsilon-caprolactam boiling at 133° to 135° C. at 9 mm. is obtained. Continuation of the distillation yields 488 parts of pure epsilon-caprolactam which boils at 136° to 137° C. at 10 mm. The residue amounts to 10 parts. The pH of a 2 per cent aqueous solution of the purified lactam is 6.95 at 22° C.

*Example 3.*—A mixture of 200 parts of crude epsilon-caprolactam containing 4.2 parts of epsilon-aminocapronitrile (by titration with 0.100 N hydrochloric acid using methyl red as an indicator) and 15 parts of methyl hydroxyacetate is heated at 175° C. at atmospheric pressure for 15 minutes. The pressure is reduced gradually and after a small foreshot consisting of unreacted methyl hydroxyacetate and lactam is removed, pure lactam in good yield is obtained. There is only a small amount of residue in the stillpot. The pH of a 2 per cent aqueous solution of the purified lactam at 22° C. is 5.5.

*Example 4.*—A solution prepared by mixing 75,000 parts of epsilon-aminocapronitrile and 25,000 parts of distilled water is fed at the rate of 80–90 cc. per minute into a vaporizer maintained at 310°–330° C. and the resulting gaseous mixture brought into contact with 3400 cc. of activated alumina catalyst of particle size 8 to 14 mesh maintained at 310° C. Under these conditions the molecular ratio of aminonitrile to water is 1:2.1, the space velocity is 650 to 735 and the contact time is 2.3 to 2.6 seconds. In traversing the catalyst, the vapor mixture is converted mainly into epsilon-caprolactam and ammonia. The product is condensed, whereupon an aqueous solution of epsilon-caprolactam, epsilon-aminocapronitrile and ammonia is obtained. One hundred and forty-five thousand (145,000) parts of the aqueous solution is heated under reduced pressure to remove the ammonia and the distillation continued under reduced pressure. There is obtained 23,800 parts of water and 11,500 parts of unconverted epsilon-aminocapronitrile which boils at 100° to 113° C. at 6 mm. The material remaining in the stillpot has an aminonitrile content of 2 to 3 per cent by weight, as determined by titration of a test portion with dilute hydrochloric acid using methyl red as an indicator. To the crude lactam at 150° to 160° C. is added, with thorough agitation, 3000 parts of diethyl oxalate. After continued agitation at atmospheric pressure for 0.5 hour, the pressure is reduced gradually. The ethanol and excess diethyl oxalate are collected as a foreshot boiling at 70° to 100° at 10 to 50 mm. Continuation of the distillation at reduced pressure gives 103,200 parts of colorless, pure epsilon-caprolactam boiling at 126° C. at 6 mm. The lactam is stored as a 78 per cent aqueous solution by withdrawing the molten lactam into water. There is a residue of 5,400 parts in the stillpot. The pH of 2 per cent aqueous solutions of various product fraction ranges from 6.2 to 6.7 at 22° C.

The space velocity specified above refers to the rate at which the gaseous reactants pass through the catalyst and is defined as the number of volumes of gas, calculated at standard conditions, that traverse one volume of catalyst during one hour. By "contact time" is meant the time in seconds required for the gaseous reactants to traverse the entire volume of the catalyst at the temperature and pressure of the reaction, assuming that no change in volume occurs. The contact time in seconds is calculated from the space velocity by the following expression.

Time of contact in secs.=

$$\frac{273 \times 60 \times 60}{(273 + \text{temp. in °C.}) \times \text{space velocity}}$$

*Example 5.*—Crude epsilon-caprolactam is prepared as outlined in Example 4. The aminonitrile content of the residual crude lactam, after removal of most of the unconverted epsilon caprolactam, is 3.1 per cent by weight as determined by titration with dilute hydrochloric acid. To 200 parts of the crude lactam at 160° C. is added 10 parts of phenyl acetate and the mixture heated at atmospheric pressure for 0.5 hour. The phenol and excess phenyl acetate are removed by fractional distillation. The main fraction is pure epsilon-caprolactam which boils at 120° to 130° C. at 8 mm. There is only a small amount of residue in the stillpot. The pH of a 2 per cent aqueous solution of the purified lactam is 5.9 at 22° C.

As indicated in the example, esters of mono- and poly-carboxylic acids can be used to convert the epsilon-aminocapronitrile into a non-volatile, heat-stable compound from which it is possible to isolate the epsilon-caprolactam by distillation. Examples of additional esters suitable in the practice of this invention include methyl formate, ethyl acetate, dimethyl succinate, phenyl propionate, diphenyl adipate, dimethyl malonate, dibenzyl sebacate, ethyl lactate, propyl alpha-hydroxybutyrate, trimethyl carballylate and dimethyl phthalate.

In its preferred embodiment, the reaction of the epsilon-aminocapronitrile and carboxylic acid ester is carried out at 150° to 175° C. However, the reaction can be carried out within a much wider range of temperatures, e. g. 50° to 350° C.

The carboxylic acid ester is added most conveniently to the crude lactam at atmospheric pressure but it can be added under reduced pressure or at pressures greater than atmospheric. In the case of low boiling esters as methyl formate, it is advantageous to operate under increased pressure, thereby preventing the methyl formate from distilling from the reaction mixture. High boiling esters, as diphenyl sebacate, can be added under reduced pressure without danger of loss by distillation.

Efficient agitation is desirable in order to bring about complete reaction of the epsilon-aminocapronitrile and the carboxylic acid ester. This can be accomplished either by means of a mechanical stirrer or by bubbling an inert gas, e. g., nitrogen, carbon dioxide, etc., through the reaction mixture. The mixture can also be mixed thoroughly by reducing the pressure to the point at which the ester begins to distill from the reaction mixture, then releasing the vacuum and allowing the ester to flow back into the stillpot. By repeating the process several times, thorough and efficient mixing of the reactants results.

As indicated in the examples, the epsilon-caprolactam is separated most conveniently from the reaction product of the epsilon-aminocapronitrile and carboxylic acid ester by distillation under reduced pressure. However, it is within the scope of the invention to separate the epsilon-caprolactam in pure form by crystallization or by a combination of crystallization and distillation.

The process of this invention is broadly applicable to the purification of epsilon-caprolactam from mixtures containing the same and epsilon-aminocapronitrile, irrespective of how such mixtures are obtained. Thus, the process is applicable to the purification of epsilon-caprolactam obtained by the processes of U. S. Patents 2,234,566; 2,221,369 and to those of applications Serial No. 410,584, Serial No. 410,585, both filed Sept. 12, 1941, and Serial No. 378,770, filed Feb. 13, 1941. Although the method of the invention is most useful for the separation of epsilon-caprolactam from epsilon-aminonitriles, it can also be used to separate epsilon-caprolactam from other amino-hydrogen containing materials, as mono- and polyamines.

It is also within the scope of this invention to separate lactams, other than epsilon-caprolactam, from amino-hydrogen containing materials. Such lactams include:

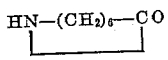

7-heptanolactam

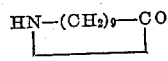

10-caprolactam

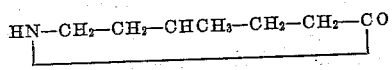

4-methyl-6-caprolactam

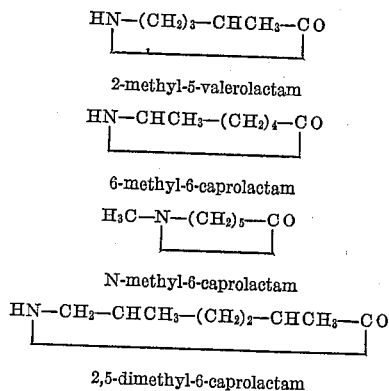

It is preferred that the epsilon-aminocapronitrile content of the crude epsilon-caprolactam be of a low value although it is within the scope of this invention to separate lactam from aminonitrile which contains relatively large amounts of the latter compound. By reducing the aminonitrile content of the crude lactam, the overall yield of lactam can be increased as recovered aminonitrile can be converted to lactam. Also the quantity of carboxylic acid ester needed is reduced. Likewise, the stillpot residue is reduced.

Epsilon-caprolactam is an important intermediate in the preparation of the soluble type of interpolymers which are useful in the preparation of coated fabrics, films, wrapping materials and protective coatings for containers.

Various changes may be made in the detailed practice of the invention without departing from the spirit and scope thereof since many apparently widely differing embodiments thereof will be apparent from a consideration of the foregoing specification and ensuing claims.

What is claimed is:

1. The process for producing purified epsilon-caprolactam which consists in bringing a vaporized mixture of water and epsilon-aminocapronitrile into contact with a dehydration catalyst at an elevated temperature, withdrawing and condensing the reaction vapors, subjecting the condensate to distillation at sub-atmospheric pressure to remove water and the major portion of unconverted epsilon-aminocapronitrile, agitating the lactam-containing residue with an amount of an organic carboxylic ester which is at least substantially chemically equivalent to the epsilon-aminocapronitrile, the treatment with the ester being carried out so that substantially little or no lactam is acylated and substantially little or no lactam is polymerized, and then subjecting the treated lactam-containing residue to vacuum distillation to separate epsilon-caprolactam.

2. The process for the purification of epsilon-caprolactam containing an amino-compound impurity, which consists in agitating and heating the said impure epsilon-caprolactam to a temperature between 50° C. and 350° C. with an amount of an organic carboxylic ester which is at least chemically equivalent to the amino-compound impurity, the treatment with the ester being carried out so that substantially little or no lactam is acylated and substantially little or no lactam is polymerized and thereafter separating the lactam by distillation under a pressure below atmospheric.

3. The process for the purification of epsilon-caprolactam obtained by the vapor-phase reaction of water and epsilon-aminocapronitrile over a dehydration catalyst, which consists in agitating and heating the said impure epsilon-caprolactam to a temperature between 150° C. and 175° C. with an amount of diethyl oxalate which is at least chemically equivalent to the epsilon-aminocapronitrile impurity, the treatment with the ester being carried out so that substantially little or no lactam is acylated and substantially little or no lactam is polymerized and thereafter separating the lactam by distillation under a pressure below atmospheric.

4. The process for the purification of epsilon-caprolactam obtained by the vapor-phase reaction of water and epsilon-aminocapronitrile over a dehydration catalyst, which consists in agitating and heating the said impure epsilon-caprolactam to a temperature between 150° C. and 175° C. with an amount of methyl hydroxyacetate which is at least chemically equivalent to the epsilon-aminocapronitrile impurity, the treatment with methyl hydroxyacetate being carried out so that substantially little or no lactam is acylated and substantially little or no lactam is polymerized and thereafter separating the lactam by distillation under a pressure below atmospheric.

5. The process for the purification of epsilon-caprolactam obtained by the vapor-phase reaction of water and epsilon-aminocapronitrile over a dehydration catalyst, which consists in agitating and heating the said impure epsilon-caprolactam to a temperature between 150° C. and 175° C. with an amount of phenyl acetate which is at least chemically equivalent to the epsilon-aminocapronitrile impurity, the treatment with phenyl acetate being carried out so that substantially little or no lactam is acylated and substantially little or no lactam is polymerized and thereafter separating the lactam by distillation under a pressure below atmospheric.

6. The process for the purification of epsilon-caprolactam obtained by the vapor-phase reaction of water and epsilon-aminocapronitrile over a dehydration catalyst, which consists in agitating and heating the said impure epsilon-caprolactam to a temperature between 50° C. and 350° C. with an amount of an organic carboxylic ester which is at least chemically equivalent to the epsilon-aminocapronitrile impurity, the treatment with the ester being carried out so that substantially little or no lactam is acylated and substantially little or no lactam is polymerized and thereafter separating the lactam by distillation under a pressure below atmospheric.

7. The process for the purification of epsilon-caprolactam obtained by the vapor-phase reaction of water and epsilon-aminocapronitrile over a dehydration catalyst, which comprises agitating and heating about 500 parts by weight of said crude epsilon-caprolactam to a temperature of about 170° C. with about 5 parts by weight diethyl oxalate, and thereafter separating pure epsilon-caprolactam by distillation under an absolute pressure of about 9 mm.

ELMORE L. MARTIN.